United States Patent
Hu et al.

(10) Patent No.: US 7,719,795 B2
(45) Date of Patent: May 18, 2010

(54) HEAD HAVING A TRANSDUCER HEATER AND AN AIR BEARING SURFACE WITH A FLOW-DIVERSION DAM AND PRESSURE-RELIEF TROUGH DISPOSED UPSTREAM OF THE TRANSDUCER

(75) Inventors: Yong Hu, Fremont, CA (US); Eric T. Sladek, Pleasanton, CA (US); Biao Sun, Fremont, CA (US); Forhad Hossain, Fremont, CA (US); Ji-Feng Ying, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 668 days.

(21) Appl. No.: 11/600,365

(22) Filed: Nov. 15, 2006

(65) Prior Publication Data
US 2008/0112084 A1    May 15, 2008

(51) Int. Cl.
*G11B 21/21* (2006.01)
*G11B 5/60* (2006.01)
(52) U.S. Cl. .................................. 360/235.7; 360/236.3
(58) Field of Classification Search .............. 360/235.7, 360/236, 236.3
See application file for complete search history.

(56) References Cited

U.S. PATENT DOCUMENTS

| | | | |
|---|---|---|---|
| 5,343,343 A | 8/1994 | Chapin | |
| 5,353,180 A | 10/1994 | Murray | |
| 5,870,250 A | 2/1999 | Bolasna et al. | |
| 5,917,679 A | 6/1999 | Park et al. | |
| 5,940,249 A * | 8/1999 | Hendriks | 360/235.6 |
| 6,021,020 A | 2/2000 | Itoh et al. | |
| 6,055,127 A | 4/2000 | Boutaghou et al. | |
| 6,072,662 A | 6/2000 | Utsunomiya | |
| 6,188,547 B1 * | 2/2001 | Gui et al. | 360/236.5 |
| 6,212,032 B1 | 4/2001 | Park et al. | |
| 6,445,542 B1 | 9/2002 | Levi et al. | |
| 6,483,667 B1 | 11/2002 | Berg et al. | |
| 6,490,135 B1 | 12/2002 | Sannino et al. | |
| 6,498,701 B1 | 12/2002 | Berg | |
| 6,504,682 B1 | 1/2003 | Sannino et al. | |
| 6,515,831 B1 | 2/2003 | Sannino et al. | |
| 6,594,113 B2 | 7/2003 | Rao et al. | |
| 6,603,639 B1 * | 8/2003 | Polycarpou et al. | 360/236.3 |
| 6,661,612 B1 | 12/2003 | Peng | |
| 6,690,545 B1 * | 2/2004 | Chang et al. | 360/237 |

(Continued)

FOREIGN PATENT DOCUMENTS

JP    07021714 A  *  1/1995

*Primary Examiner*—Craig A. Renner

(57) ABSTRACT

A head for use in an information storage device includes a novel ABS, and a transducer with a heating element. The ABS includes a transducer pad that includes a surface in a first plane. The ABS also includes a pressure-relief trough that is recessed from the first plane by at least 0.1 microns and has an upstream breadth of no more than one fourth of the total length of the slider. The pressure-relief trough is disposed immediately upstream of the transducer pad and continuously spans the total width of the transducer pad. The ABS also includes a flow-diversion dam that has a dam surface that lies in the first plane. The dam surface continuously spans the total width of the transducer pad. The dam surface is disposed immediately upstream of the pressure-relief trough and generally downstream of a sub-ambient pressure cavity.

6 Claims, 5 Drawing Sheets

U.S. PATENT DOCUMENTS

| | | | |
|---|---|---|---|
| 6,707,631 B1 * | 3/2004 | Haddock | 360/236.3 |
| 6,747,847 B2 | 6/2004 | Stoebe et al. | |
| 6,785,093 B2 | 8/2004 | Baba et al. | |
| 6,989,967 B2 | 1/2006 | Pendray et al. | |
| 7,009,813 B2 | 3/2006 | Kang et al. | |
| 7,019,945 B1 | 3/2006 | Peng et al. | |
| 7,027,265 B2 | 4/2006 | Koishi | |
| 7,251,106 B2 | 7/2007 | Nikitin et al. | |
| 7,289,299 B1 | 10/2007 | Sun et al. | |
| 7,583,473 B2 | 9/2009 | Bolasna et al. | |
| 7,616,405 B2 | 11/2009 | Hu et al. | |
| 2001/0030834 A1 * | 10/2001 | Kohira et al. | 360/235.8 |
| 2002/0008938 A1 | 1/2002 | Nath et al. | |
| 2002/0012199 A1 * | 1/2002 | Polycarpou et al. | 360/235.8 |
| 2002/0030938 A1 | 3/2002 | Boutaghou | |
| 2002/0041467 A1 | 4/2002 | Boutaghou et al. | |
| 2002/0048120 A1 | 4/2002 | Boutaghou et al. | |
| 2002/0051316 A1 | 5/2002 | Boutaghou | |
| 2002/0060881 A1 * | 5/2002 | Chapin et al. | 360/236.3 |
| 2002/0071216 A1 | 6/2002 | Sannino et al. | |
| 2002/0089789 A1 | 7/2002 | Baba et al. | |
| 2002/0109941 A1 | 8/2002 | Chapin et al. | |
| 2003/0058578 A1 * | 3/2003 | Boutaghou et al. | 360/236.3 |
| 2003/0067719 A1 | 4/2003 | Boutaghou et al. | |
| 2003/0128471 A1 | 7/2003 | Bolsna et al. | |
| 2003/0227717 A1 | 12/2003 | Cha et al. | |
| 2004/0032694 A1 | 2/2004 | Sun et al. | |
| 2004/0100732 A1 | 5/2004 | Deng et al. | |
| 2004/0156143 A1 | 8/2004 | Kang | |
| 2004/0233580 A1 * | 11/2004 | Yao et al. | 360/236.3 |
| 2004/0240109 A1 | 12/2004 | Hamann et al. | |
| 2005/0099728 A1 | 5/2005 | Deng et al. | |
| 2005/0105216 A1 | 5/2005 | Ueno et al. | |
| 2005/0190500 A1 | 9/2005 | Song | |
| 2005/0207065 A1 * | 9/2005 | Takagi | 360/235.7 |
| 2005/0213252 A1 | 9/2005 | Park | |
| 2005/0225902 A1 | 10/2005 | Kohira | |
| 2006/0023358 A1 | 2/2006 | Huang | |
| 2006/0119986 A1 | 6/2006 | Takeuchi et al. | |
| 2006/0238922 A1 | 10/2006 | Hanyu | |
| 2007/0121238 A1 | 5/2007 | Kondo et al. | |
| 2007/0206326 A1 * | 9/2007 | Zhang | 360/235.7 |
| 2007/0211385 A1 | 9/2007 | Kondo et al. | |
| 2008/0024924 A1 | 1/2008 | Bolasna et al. | |

* cited by examiner

HEAD HAVING A TRANSDUCER HEATER AND AN AIR BEARING SURFACE WITH A FLOW-DIVERSION DAM AND PRESSURE-RELIEF TROUGH DISPOSED UPSTREAM OF THE TRANSDUCER

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, a ramp 116, and a head stack assembly (HSA) 106. The spindle motor typically includes a rotating hub on which disks mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface can not be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

One way that a disk drive designer can improve the prospects of reaching an acceptable compromise in the "trade-off" described above, is to increase the complexity of the disk drive so as to dynamically control flying height. That is, additional head components and/or disk drive components, such as a transducer heater, are included and actively controlled so that the flying height can be temporarily reduced only while the head is reading or writing. When the head is not reading or writing, it can "fly" at a slightly-higher nominal flying height to improve tribological performance. Such active control of flying height is sometimes referred to as "dynamic flying height" control (a.k.a. "DFH").

If a transducer heater is used to accomplish DFH control via thermal expansion of the head near the transducer, such thermal expansion can also temporarily and locally change the air bearing design. However, the flying height, and therefore the spacing between the transducer or objective lens and the disk surface, depends strongly on the design of the air bearing surface. Temporary and local changes in the air bearing surface design can hinder DFH control by opposing the effect of the transducer heater.

Accordingly, what is needed in the art is an air bearing design that is less sensitive to the thermal expansion associated with the use of a transducer heater to accomplish DFH control.

SUMMARY

A head for use in a magnetic hard disk drive or other information storage device includes a novel air bearing surface, and a transducer with a heating element. The novel air bearing surface includes a leading pad including a major surface in a first plane, and a sub-ambient pressure cavity adjacent the leading pad. The sub-ambient pressure cavity includes a surface that is recessed from the first plane. The air bearing surface also includes a transducer pad that defines a transducer pad total width. The transducer pad includes a face of the transducer and includes a surface that lies in the first plane. The air bearing surface also includes a pressure-relief trough that is recessed from the first plane by at least 0.1 microns and has an upstream breadth of no more than one fourth of a total length of the slider. The pressure-relief trough is disposed immediately upstream of the transducer pad and continuously spans the total width of the transducer pad. The air bearing surface also includes a flow-diversion dam that has a dam surface that lies in the first plane. The dam surface continuously spans the total width of the transducer pad. The dam surface is disposed immediately upstream of the pressure-relief trough and generally downstream of the sub-ambient pressure cavity.

DETAILED DESCRIPTION OF EXEMPLARY EMBODIMENTS

Figure 1:
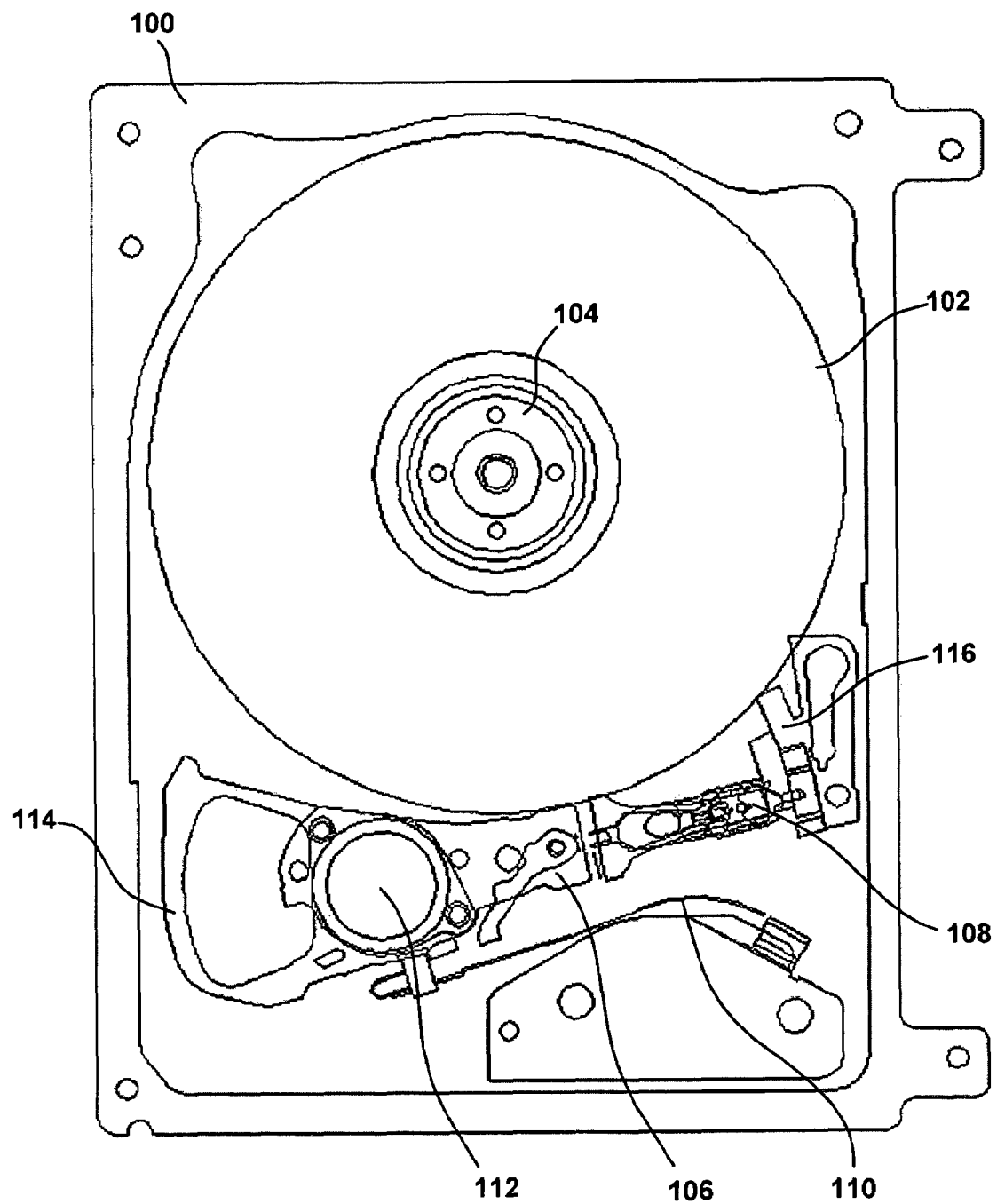
FIG. 1 depicts a contemporary hard disk drive information storage device.
Figure 2:
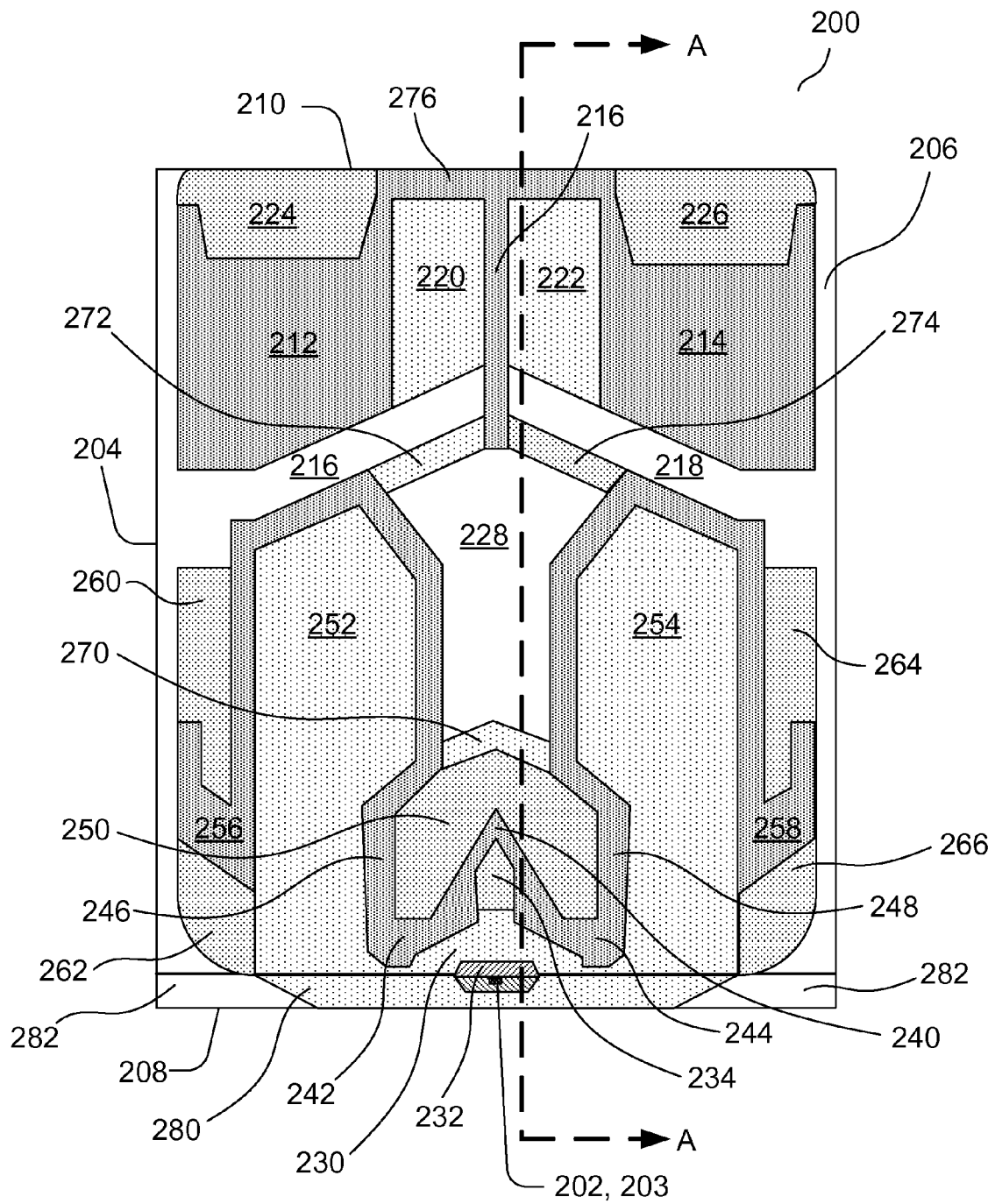
FIG. 2 is an air bearing surface view of a head according to an exemplary embodiment of the present invention (not necessarily to scale).

Now referring to FIG. 2, head 200 comprises a transducer 202 for at least reading information from the disk. In certain embodiments, the transducer 202 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer. Transducer 202 of FIG. 2 also comprises a heating element 203 such as a resistive path through which an electrical current may be forced. Examples of such heating elements are known in the art (see, e.g., U.S. patent application Ser. No. 10/452,553 to Hamann et al.).

Head 200 also comprises a slider 204, which is typically fabricated from a ceramic material such as alumina titanium carbide. Slider 204 includes an air bearing surface 206, which may be formed on the surface of slider 204 by etching or ion milling and has a geometry that may be defined by use of a mask. The head 200 also includes a trailing edge 208, and a leading edge 210.

Figure 3:
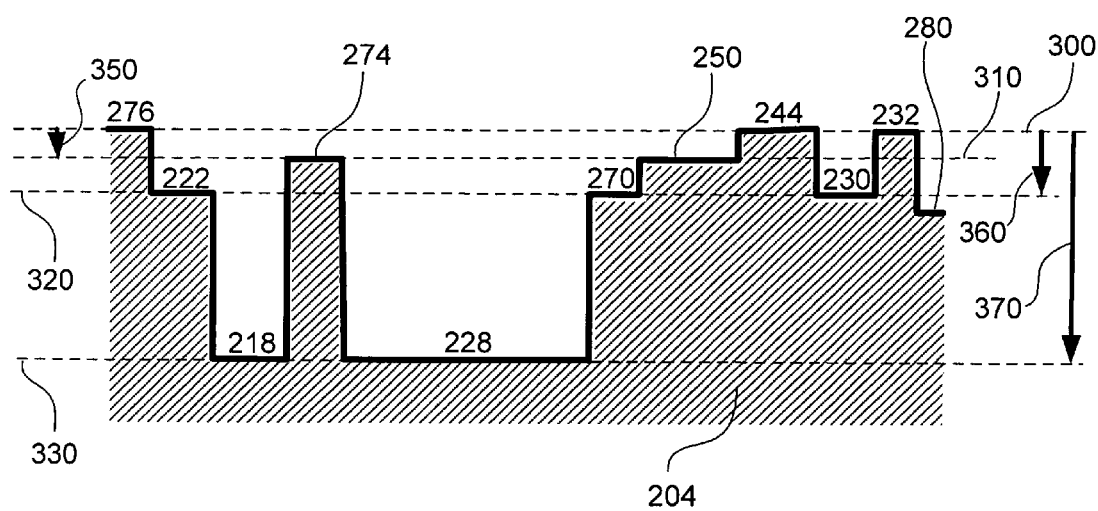
FIG. 3 is cross-sectional view of the head shown in FIG. 2, taken along the plane of cross-section designated as A-A in FIG. 2. For clarity, only the region of the cross-section near the air bearing surface is shown in FIG. 3 and the step heights are not to scale but rather are exaggerated so as to be easily discernible

In the exemplary embodiment shown in FIG. 2 and FIG. 3, the air bearing surface 206 includes deep cavities 216 and 218. In the exemplary embodiment shown in FIG. 2 and FIG. 3, deep cavity 216 includes shallow cavity 220, and deep cavity 218 includes shallow cavity 222. During operation, the shallow cavities 220 and 222 can develop a sub-ambient pressure region between the air bearing surface 206 and the surface of and adjacent disk. The sub-ambient pressure may serve to reduce flying height sensitivity to changes in altitude.

In the exemplary embodiment shown in FIG. 2 and FIG. 3, the air bearing surface 206 also includes two leading pads 212 and 214 that are adjacent to and upstream of the deep cavities 216 and 218, respectively. The term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing edge 208 and towards the leading edge 210. As such, in disk drive applications, upstream directions would ultimately be generally opposite the motion of an adjacent rotating disk surface. An upstream direction would be a direction within the aforementioned range. The term "downstream" is used herein as an antonym of "upstream."

For each upstream direction, the air bearing surface 206 defines a lateral axis that is perpendicular to that upstream direction. For example, for a zero-skew upstream direction that is parallel to the air bearing surface 206 and parallel to the plane of cross-section AA depicted in FIG. 2, the air bearing surface defines a corresponding lateral axis that is parallel to the leading edge 210 or the trailing edge 208 (i.e. orthogonal to that upstream direction). Of course, non-zero skew upstream directions are also contemplated herein.

The two leading pads 212, 214 are separated by shallow cavities 220 and 220, respectively, and shallow cavities 220 and 222 are themselves separated by a longitudinal divider 216. In certain embodiments, the longitudinal divider 216 has a maximum length that is in the range of 50 microns to half of the length of the slider.

The leading pads 212 and 214 each include a major surface that is not recessed and instead establishes an air bearing surface datum plane (hereinafter referred to as the first plane) 300, from which the recession of other surfaces that are parallel to the first plane 300 may be measured. During operation, the leading pads 212 and 214 can develop a super-ambient pressure region between the air bearing surface 206 and the surface of an adjacent disk, causing the slider to assume a positive pitch attitude. Deep cavities 216 and 218 each include a surface in a plane 330 that is recessed from the first plane 300 by a deep cavity recession depth 370. The deep cavity recession depth is preferably but not necessarily in the range 2 microns to 5 microns. Shallow cavities 220 and 222 each include a surface in an intermediate plane 320 that lies between the first plane 300 and the deep cavity plane 330, and that is recessed from the first plane 300 by a shallow cavity recession depth 360. For example, the shallow cavity recession depth 360 is preferably but not necessarily in the range 0.5 microns to 1.5 microns.

In the exemplary embodiment shown in FIG. 2 and FIG. 3, the leading pads 212 and 214 are connected by a leading dam 276 that helps prevent particulate contamination from entering the air bearing, that develops super-ambient pressure, and that assists in creating sub-ambient pressure in shallow cavities 220 and 222. The leading pads 212 and 214 also include leading pressurizing steps 224 and 226, respectively. The leading pressurizing steps 224 and 226 each include a surface in a plane 310 that lies between the first plane 300 and the intermediate plane 320. The plane 310 is recessed from the first plane 300 by a pressurizing step recession depth 350. During operation, the leading pressurizing steps 224 and 226 can help develop super-ambient pressure between the leading pads 212 and 214, respectively and the surface of an adjacent disk. The pressurizing step recession depth 350 is preferably but not necessarily in the range 0.1 microns to 0.3 microns.

Also in the exemplary embodiment of FIG. 2 and FIG. 3, the air bearing surface 206 includes mid-cavity dams 272 and 274 that are disposed upstream of a central cavity 228. Mid-cavity dam 272 includes a surface in the plane 320, while mid-cavity dam 274 includes a surface in the plane 310.

Moreover, mid-cavity dam 272 is oriented to confront the skewed incoming air flow when the head is near the inner diameter of the disk, while mid-cavity dam 274 is oriented to confront the differently-skewed incoming air flow when the head is near the outer diameter of the disk. Because mid-cavity dam 272 is recessed from the first plane 300 more than mid-cavity dam 274 is, mid-cavity dam 272 tends to allow airflow into central cavity 228 more easily than mid-cavity dam 274 does. This difference in recession can be used by the air bearing designer to desensitize the flying height to changes in the radial position of the head relative to the spinning underlying disk, given that the incoming air flow has a higher velocity near the outer diameter of the disk and a lower velocity near the inner diameter of the disk. If the air bearing designer advantageously opts to use the mid-cavity dams 272 and 274 to desensitize the flying height to changes in the radial position of the head relative to the spinning underlying disk, then the air bearing designer will have more freedom to design downstream features of the air bearing 206, for example to reduce air bearing sensitivity to changes in operating altitude, applied bias forces and torques, and/or crown or camber curvatures of the slider 204.

In the exemplary embodiment of FIG. 2 and FIG. 3, the air bearing surface 206 also includes trailing pads 242 and 244 that are not recessed from the first plane 300. During operation, the trailing pads 242 and 244 can develop a super-ambient pressure region between the air bearing surface 206 and the surface of an adjacent disk that can help maintain a desired flying height at the location of transducer 202. For example, in the embodiment of FIG. 2 and FIG. 3, the trailing pads 242 and 244 create two regions of high pressure, including the highest pressure generated by the air bearing surface during normal operation of the head.

In the embodiment of FIG. 2 and FIG. 3, a pressurizing step surface 250 is disposed upstream of the trailing pads 242 and 244, and a pressurizing step surface 234 is also included. The pressurizing step surface 250 includes a surface that lies in the plane 310. For example, the step surface may be recessed from the first surface 300 by a pressurizing step recession depth 350 in the range 0.1 microns to 0.3 microns. The pressurizing step surface 250 may or may not also include a leading surface 270 which is recessed further than plane 310. For example, the leading surface 270 may lie in plane 320.

During operation, the pressurizing step surface 250 can enhance the super-ambient pressure between the trailing pads 242 and 244 and the surface of an adjacent disk. Such enhanced pressurization may reduce the surface area required for the trailing pads 242 and 244. Trailing pad side portions 246 and 248 can enhance the performance of the pressurizing step surface 250 by partially confining the airflow to pressurize the trailing pads 242 and 244.

The embodiment of FIG. 2 and FIG. 3 includes a transducer pad 232 that incorporates a face of transducer 202. Each of the trailing pads 242 and 244 in FIG. 2 is disposed with opposing lateral separation from the transducer pad 232, with each opposing lateral separation being in the range 10 to 25 microns.

Upstream of the transducer pad 232, the air bearing 206 includes a flow diverting dam 240 that includes and connects the trailing pads 242 and 244, and includes a dam surface in the first plane 300. The trailing pads 242 and 244 each comprise a portion of the dam surface that lies in the first plane 300. The dam surface is separated from the transducer pad 232 by an upstream distance that is no more than one fourth of a total length of the slider. For example, one fourth of the length of a so-called "nano" form-factor slider is approximately 500 microns, one fourth of the length of a so-called "pico" form-factor slider is approximately 250 microns, and one fourth of the length of a so-called "fempto" form-factor slider is approximately 200 microns. Preferably the upstream separation is at least 10 microns. The dam surface spans at least the total width of the transducer pad 232 measured along the lateral axis. The flow diverting dam 240 can divert the air flow from central cavity 228 towards the trailing pads 242 and 244 and away from transducer 202.

In the embodiment of FIG. 2 and FIG. 3, the flow diverting dam 240 including the trailing pads 242 and 244, and the trailing pad side portions 246 and 248, together form a trailing center pressurizing structure that has the general shape of the letter "W." For example, the flow diverting dam 240 could be considered to be the center peak of the letter "W," the trailing pads 242 and 244 would include the bottom points of the letter "W," and the trailing pad side portions 246 and 248 could be considered to be the outer sides of the letter "W." In this regard, the center peak of the "W" extends further upstream than the bottom points of the "W."

The air bearing 206 of FIG. 2 and FIG. 3 also includes a pressure relief trough 230 separating the transducer pad 232 from the flow diverting dam 240 and from the trailing pads 242 and 244. In this embodiment, the pressure-relief trough 230 is disposed immediately upstream of the transducer pad 232. This can be seen from FIG. 2 since the pressure-relief trough 230 is there depicted to be disposed adjacent to and upstream of the transducer pad 232. The pressure relief trough 230 also continuously spans at least the total width of the transducer pad 232 measured parallel to the lateral axis. The pressure relief trough 230 is preferably recessed from the first plane 300 enough to substantially decouple the pressurization of the transducer pad 232 from that of the trailing pads 242 and 244. For example, in the embodiment of FIG. 2 and FIG. 3, the pressure relief trough 230 is depicted to include a surface in the intermediate plane 320. Alternatively, the pressure relief trough may include a surface in the plane 330 or the plane 310. Alternatively the pressure relief trough 230 may include a surface in a plane that is not co-planar with planes 310, 320, or 330 (but is recessed from the first plane 300 by at least 0.1 microns), but this is not preferred in the interest of fabrication process simplicity. In any of these four examples, the pressure-relief trough 230 is recessed from the first plane 300 by at least 0.1 microns.

The pressure-relief trough 230 is optionally but preferably shaped to substantially follow a contour of equal thermal expansion that results from energizing the heating element. A contour of equal thermal expansion is a locus or region on or around the transducer where the material surrounding the transducer (typically mostly alumina or alumina titanium carbide) expands towards an adjacent disk surface by an equal amount due to energizing the heating element. A pressure-relief trough can be considered to substantially follow a contour of equal thermal expansion if, for example, a contour that passes through the pressure-relief trough does not cross the pressure-relief trough.

In certain embodiments, the air bearing surface 206 may also include two shallow side cavities 252 and 254 that are downstream of the deep cavities 216 and 218, respectively. The shallow side cavities 252 and 254 each include a surface in the plane 320. During operation, the shallow side cavities 252 and 254 may develop sub-ambient pressure in much the same way that shallow cavities 220 and 222 do, and thereby shift an effective center of net sub-ambient pressure rearward (towards the trailing edge of the slider). Such a shift can facilitate separating the slider from the disk surface dynamically, during operation. The two shallow side cavities 252 and 254 extend rearward to include region 280. Region 280 may include a surface that is recessed from the first plane 300 more than the plane 320 because the two shallow side cavities 252 and 254 are disposed over the main body of the slider 204, which typically comprises the ceramic material alumina titanium carbide, while region 282 which includes region 280 comprises overcoat material which is typically alumina. Alumina typically etches away more rapidly than does alumina titanium carbide during fabrication of the shallow side cavities 252 and 254 and the region 280.

In the embodiment of FIG. 2 and FIG. 3, the air bearing surface 206 also includes side pads 256 and 258, each being laterally spaced from the trailing pad side portions 246 and 248, respectively. The side pads 256 and 258 each include a major surface that lies in the first plane 300. The side pad 256 includes side pressurizing step 260 which includes a surface in plane 310. The side pad 258 includes side pressurizing step 264 which includes a surface in plane 310. Side pads 256 and 258 include trailing side steps 262 and 266, respectively. Trailing side steps 262 and 266 are recessed from the first plane 300 so as to lie in plane 310, to ensure that they do not include the lowest flying height of the air bearing surface 206 despite a potentially non-zero roll angle during operation. It is desired that the lowest flying height of the air bearing surface 206 occur nearer to the transducer 202.

Figure 4:
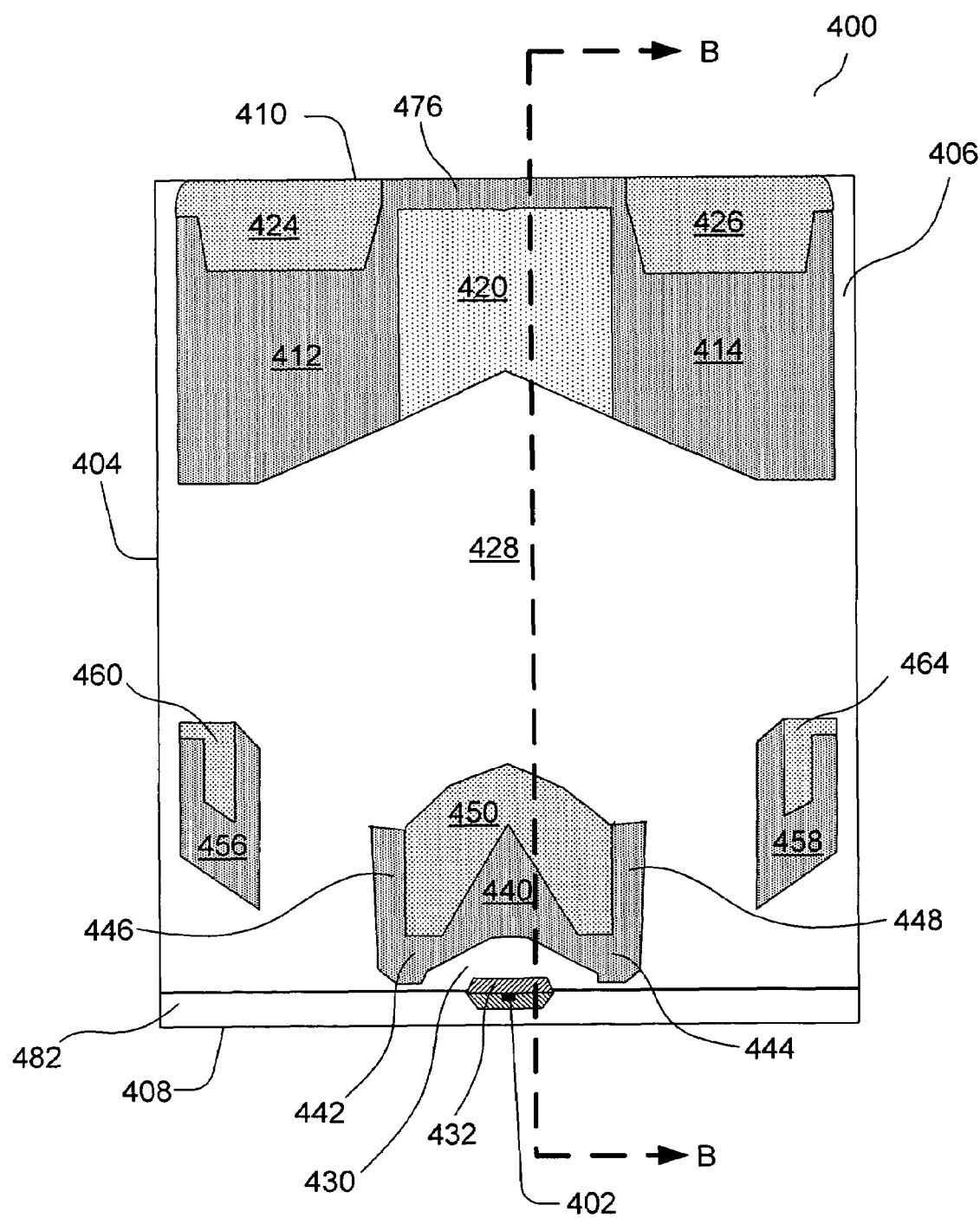
FIG. 4 is an air bearing surface view of a head according to another exemplary embodiment of the present invention (not necessarily to scale).

Now referring to FIG. 4, head 400 comprises a transducer 402 for at least reading information from the disk. Transducer 402 of FIG. 4 also comprises a heating element such as a resistive path through which an electrical current may be forced.

Head 400 also comprises a slider 404, which is typically fabricated from a ceramic material such as alumina titanium carbide. Slider 404 includes an air bearing surface 406, which may be formed on the surface of slider 404 by etching or ion milling and has a geometry that may be defined by use of a mask. The head 400 also includes a trailing edge 408, and a leading edge 410.

Figure 5:
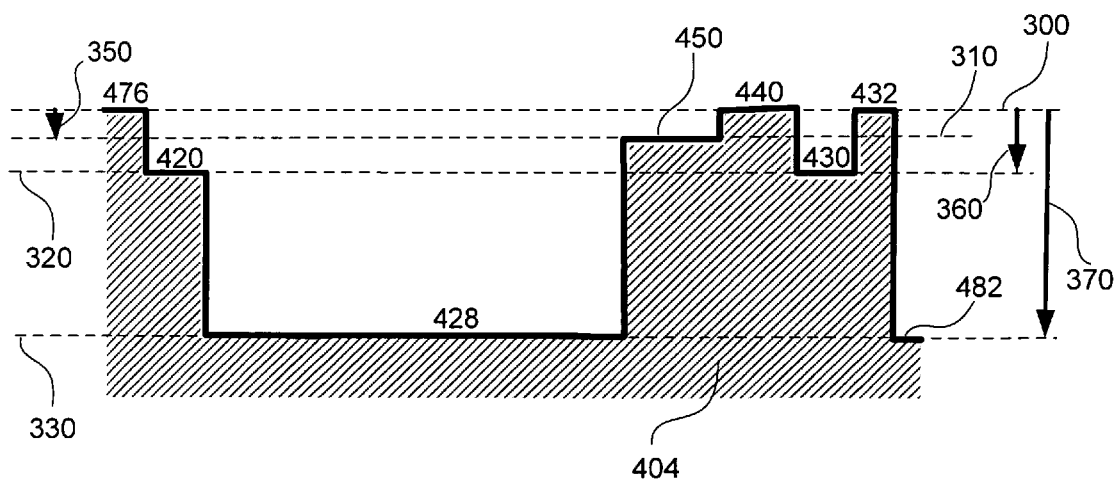
FIG. 5 is cross-sectional view of the head shown in FIG. 4, taken along the plane of cross-section designated as B-B in FIG. 2. For clarity, only the region of the cross-section near the air bearing surface is shown in FIG. 5 and the step heights are not to scale but rather are exaggerated so as to be easily discernible.

In the exemplary embodiment shown in FIG. 4 and FIG. 5, the air bearing surface 406 includes shallow cavity 420. During operation, the shallow cavity 420 can develop a sub-ambient pressure region between the air bearing surface 406 and the surface of and adjacent disk. The sub-ambient pressure may serve to reduce flying height sensitivity to changes in altitude.

In the exemplary embodiment shown in FIG. 4 and FIG. 5, the air bearing surface 406 also includes two leading pads 412 and 414 that are adjacent to and separated by shallow cavity 420. The leading pads 412 and 414 each include a major surface that is not recessed and instead establishes an air bearing surface datum plane (herein referred to as the first plane) 300, from which the recession of other surfaces that are parallel to the first plane 300 may be measured. During operation, the leading pads 412 and 414 can develop a super-ambient pressure region between the air bearing surface 406 and the surface of an adjacent disk, causing the slider to assume a positive pitch attitude. Deep central cavity 428 includes a surface in a plane 330 that is recessed from the first plane 300 by a deep cavity recession depth 370. The deep cavity recession depth is preferably but not necessarily in the range 2 microns to 5 microns. Shallow cavity 420 includes a surface in an intermediate plane 320 that lies between the first plane 300 and the deep cavity plane 330, and that is recessed from the first plane 300 by a shallow cavity recession depth 360. For example, the shallow cavity recession depth 360 may be in the range 0.5 microns to 1.5 microns.

In the exemplary embodiment shown in FIG. 4 and FIG. 5, the leading pads 412 and 414 are connected by a leading dam 476 that that helps prevent particulate contamination from entering the air bearing, that develops super-ambient pressure, and that assists in creating sub-ambient pressure in shallow cavity 420. The leading pads 412 and 414 also include leading pressurizing steps 424 and 426, respectively. The leading pressurizing steps 424 and 426 each include a surface in a plane 310 that lies between the first plane 300 and the intermediate plane 320. The plane 310 is recessed from the first plane 300 by a pressurizing step recession depth 350. During operation, the leading pressurizing steps 424 and 426 can help develop super-ambient pressure between the leading pads 412 and 414, respectively, and the surface of an adjacent disk.

In the exemplary embodiment of FIG. 4 and FIG. 5, the air bearing surface 406 also includes trailing pads 442 and 444 that are not recessed from the first plane 300. During operation, the trailing pads 442 and 444 can develop a super-ambient pressure region between the air bearing surface 406 and the surface of an adjacent disk that can help maintain a desired flying height at the location of transducer 402. For example, in the embodiment of FIG. 4 and FIG. 5, the trailing pads 442 and 444 create two regions of high pressure, including the highest pressure generated by the air bearing surface during normal operation of the head.

In the embodiment of FIG. 4 and FIG. 5, a pressurizing step surface 450 is disposed upstream of the trailing pads 442 and 444. The pressurizing step surface 450 includes a surface that lies in the plane 310. For example, the step surface may be recessed from the first surface 300 by a pressurizing step recession depth 350 in the range 0.1 microns to 0.3 microns. During operation, the pressurizing step surface 450 can enhance the super-ambient pressure between the trailing pads 442 and 444 and the surface of an adjacent disk. Such enhanced pressurization may reduce the surface area required for the trailing pads 442 and 444. Trailing pad side portions 446 and 448 can enhance the performance of the pressurizing step surface 450 by partially confining the airflow to pressurize the trailing pads 442 and 444.

The embodiment of FIG. 4 and FIG. 5 includes a transducer pad 432 that incorporates a face of transducer 402. Each of the trailing pads 442 and 444 in FIG. 4 is disposed with opposing lateral separation from the transducer pad 432, with each opposing lateral separation being in the range 10 to 25 microns.

Upstream of the transducer pad 432, the air bearing 406 includes a flow diverting dam 440 that includes and connects the trailing pads 442 and 444, and includes a dam surface in the first plane 300. The trailing pads 442 and 444 each comprise a portion of the dam surface that lies in the first plane 300. The dam surface is separated from the transducer pad 432 by an upstream distance that is no more than one fourth of a total length of the slider. For example, one fourth of the length of a so-called "nano" form-factor slider is approximately 500 microns, one fourth of the length of a so-called "pico" form-factor slider is approximately 250 microns, and one fourth of the length of a so-called "fempto" form-factor slider is approximately 200 microns. Preferably the upstream separation is at least 10 microns. The dam surface spans at least the total width of the transducer pad 432 measured along the lateral axis. The flow diverting dam 440 can divert the air flow from central cavity 428 towards the trailing pads 442 and 444 and away from transducer 402.

In the embodiment of FIG. 4 and FIG. 5, the flow diverting dam 440 including the trailing pads 442 and 444, and the trailing pad side portions 446 and 448, together form a trailing center pressurizing structure that has the general shape of the letter "W." For example, the flow diverting dam 440 could be considered to be the center peak of the letter "W," the trailing pads 442 and 444 would include the bottom points of the letter "W," and the trailing pad side portions 446 and 448 could be considered to be the outer sides of the letter "W." In this regard, the center peak of the "W" extends further upstream than the bottom points of the "W."

The air bearing 406 of FIG. 4 and FIG. 5 also includes a pressure relief trough 430 separating the transducer pad 432 from the flow diverting dam 440 and from the trailing pads 442 and 444. The pressure-relief trough 430 is disposed immediately upstream of the transducer pad 432 and continuously spans at least the total width of the transducer pad 432 measured parallel to the lateral axis. The pressure relief trough 430 is preferably recessed from the first plane 300 enough to substantially decouple the pressurization of the transducer pad 432 from that of the trailing pads 442 and 444. For example, in the embodiment of FIG. 4 and FIG. 5, the pressure relief trough 430 is depicted to include a surface in the intermediate plane 320. Alternatively, the pressure relief trough may include a surface in the plane 330 or the plane 310. Alternatively, the pressure relief trough 430 may include a surface in a plane that is not co-planar with planes 310, 320, or 330 (but is recessed from the first plane 300 by at least 0.1 microns), but this is not preferred in the interest of fabrication process simplicity. In any of these four examples, the pressure-relief trough 430 is recessed from the first plane 300 by at least 0.1 microns. The pressure-relief trough 430 is optionally but preferably shaped to substantially follow a contour of equal thermal expansion that results from energizing the heating element. If the pressure relief trough 430 extends into overcoat material region 482, then it may there be recessed from the first plane 300 even more than the plane 330, because overcoat material (e.g. alumina) may etch more rapidly (e.g. approximately 30% more rapidly) than does the slider material (e.g. alumina titanium carbide).

In the embodiment of FIG. 2 and FIG. 3, the air bearing surface 206 also includes side pads 456 and 458, each being laterally spaced from the trailing pad side portions 446 and 448, respectively. The side pads 456 and 458 each include a major surface that lies in the first plane 300. The side pad 456 includes side pressurizing step 460 which includes a surface in plane 310. The side pad 458 includes side pressurizing step 464 which includes a surface in plane 310.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
    a transducer including at least a read transducer and a heating element; and
    a slider having an air bearing surface, the air bearing surface defining an upstream direction and a lateral axis that is orthogonal to the upstream direction, the air bearing surface including:
        a leading pad including a major surface in a first plane;
        a sub-ambient pressure cavity adjacent the leading pad, the sub-ambient pressure cavity including a surface that is recessed from the first plane;
        a transducer pad, the transducer pad defining a total width measured parallel to the lateral axis, the transducer pad including a face of the transducer and including a surface that lies in the first plane;
        a pressure-relief trough recessed from the first plane by at least 0.1 microns and having a breadth measured in the upstream direction of no more than one fourth of a total length of the slider, the pressure-relief trough being disposed immediately upstream of the transducer pad and continuously spanning the total width of the transducer pad; and
        a flow-diversion dam including a dam surface that lies in the first plane, the dam surface continuously spanning the total width of the transducer pad, the dam surface being disposed immediately upstream of the pressure-relief trough and generally downstream of the sub-ambient pressure cavity, and wherein the dam surface is shared like a letter W that is oriented so that the center peak of the W extends further upstream than the bottom points of the W.

2. The head of claim 1 further including a step surface immediately upstream of the bottom points of the W, the step surface being recessed from the first plane by a step depth in the range 0.1 microns to 0.3 microns.

3. The head of claim 1 wherein the dam surface is separated from the transducer pad by a distance measured in the upstream direction in the range 10 microns to 250 microns.

4. The head of claim 1 wherein the pressure-relief trough is shaped to substantially follow a contour of equal thermal expansion that results from energizing the heating element.

5. The head of claim 1 wherein the surface of the sub-ambient pressure region is recessed from the first plane by a depth of 0.5 microns to 1.5 microns.

6. A head comprising:
    a transducer including at least a read transducer and a heating element;
    a slider having an air bearing surface, the air bearing surface including a transducer pad, the transducer pad including a face of the transducer, and
        means for diverting an upstream air flow laterally away from the transducer pad to prevent significant air pressurization over the transducer pad, and
        means for creating two regions of high pressure, each region of high pressure being disposed with opposing lateral separation from the transducer pad, each opposing lateral separation being in the range 10 to 25 microns, and each region of high pressure including the highest pressure generated by the air bearing surface during normal operation of the head.

* * * * *

UNITED STATES PATENT AND TRADEMARK OFFICE
CERTIFICATE OF CORRECTION

| | |
|---|---|
| PATENT NO. | : 7,719,795 B2 |
| APPLICATION NO. | : 11/600365 |
| DATED | : May 18, 2010 |
| INVENTOR(S) | : Hu et al. |

It is certified that error appears in the above-identified patent and that said Letters Patent is hereby corrected as shown below:

Col. 10, Line 26: Delete "shared" and insert --shaped--.

Signed and Sealed this

Twenty-eighth Day of September, 2010

David J. Kappos
*Director of the United States Patent and Trademark Office*